(12) United States Patent
Yang et al.

(10) Patent No.: US 12,238,418 B1
(45) Date of Patent: Feb. 25, 2025

(54) PROTECTION STRUCTURES FOR SENSOR-SHIFT CAMERAS

(71) Applicant: Apple Inc., Cupertino, CA (US)

(72) Inventors: Qiang Yang, Fremont, CA (US); Aurelien R Hubert, Saratoga, CA (US); Vijay Kumar, Fremont, CA (US)

(73) Assignee: Apple Inc., Cupertino, CA (US)

( * ) Notice: Subject to any disclaimer, the term of this patent is extended or adjusted under 35 U.S.C. 154(b) by 204 days.

(21) Appl. No.: 17/933,702

(22) Filed: Sep. 20, 2022

Related U.S. Application Data (60) Provisional application No. 63/247,769, filed on Sep. 23, 2021.

(51) Int. Cl.
| | |
|---|---|
| *H04N 23/68* | (2023.01) |
| *G02B 6/32* | (2006.01) |
| *G02B 6/38* | (2006.01) |
| *G02B 6/44* | (2006.01) |
| *G03B 5/00* | (2021.01) |
| *G03B 13/36* | (2021.01) |
| *H04N 23/51* | (2023.01) |
| *H04N 23/55* | (2023.01) |

(52) U.S. Cl.
CPC ........... *H04N 23/687* (2023.01); *H04N 23/51* (2023.01); *H04N 23/55* (2023.01)

(58) Field of Classification Search
CPC ...... H04N 23/51; H04N 23/55; H04N 23/687; H04N 23/54; H04N 23/57; H04N 23/68; H04N 23/681; G03B 13/36; G03B 5/00; G03B 5/02; G03B 5/06; G02B 6/02395; G02B 6/325; G02B 6/3849; G02B 6/443; G02B 6/4486
See application file for complete search history.

(56) References Cited

U.S. PATENT DOCUMENTS

| | | | |
|---|---|---|---|
| 9,151,963 B2 | 10/2015 | Sato et al. | |
| 9,256,044 B2 | 2/2016 | Terajima | |
| 10,863,094 B2 * | 12/2020 | Sharma | G02B 7/08 |
| 10,890,825 B2 | 1/2021 | Hu et al. | |
| 10,958,815 B1 * | 3/2021 | Chen | H04N 23/52 |
| 11,122,205 B1 * | 9/2021 | Sharma | H04N 23/54 |
| 11,800,209 B1 * | 10/2023 | Smyth | H04N 23/54 |
| 11,974,031 B1 * | 4/2024 | Patel | H04N 23/54 |
| 12,088,897 B1 * | 9/2024 | Patel | H04N 23/57 |
| 2016/0165125 A1 * | 6/2016 | Kim | G03B 3/10 |
| | | | 348/345 |
| 2019/0020822 A1 * | 1/2019 | Sharma | G02B 7/08 |

* cited by examiner

*Primary Examiner* — Marly S Camargo
(74) *Attorney, Agent, or Firm* — Robert C. Kowert; Kowert, Hood, Munyon, Rankin & Goetzel, P.C.

(57) ABSTRACT

A camera may comprise a sensor-shift structure including a substrate to allow an image sensor to be movable relative to one or more lenses of the camera in one or more directions. During a drop or shock event, the substrate may experience unwanted movement and collide with a base structure in the vicinity. The camera may include one or more protection structures to prevent the substrate from directly colliding with the base structure to protect the base structure from potential damages. The protection structures may be implemented using components placed at the substrate and/or the base structure.

18 Claims, 9 Drawing Sheets

FIG. 1A

Top view

Cross-sectional view B-B'

Top view

Cross-sectional view D-D'

PROTECTION STRUCTURES FOR SENSOR-SHIFT CAMERAS

This application claims benefit of priority to U.S. Provisional Application Ser. No. 63/247,769, entitled "Protection Structures for Sensor-Shift Cameras" filed Sep. 23, 2021, and which is hereby incorporated herein by reference in its entirety.

BACKGROUND

Technical Field

This disclosure relates generally to a camera and more specifically to protection structures for a camera that includes a movable image sensor.

Description of the Related Art

Mobile multipurpose devices such as smartphones, tablets, and/or pad devices are considered as a necessity nowadays. They integrate various functionalities in one small package thus providing tremendous convenience for use. Most, if not all, of today's mobile multipurpose devices include at least one camera. Some cameras may incorporate a sensor-shift design that allows an image sensor to move relative to a lens of the cameras in order to implement various camera functions. For instance, some cameras may sense and react to external excitation/disturbance by adjusting location of an image sensor relative to a lens of the camera in an attempt to compensate for unwanted motion of the lens. Furthermore, some cameras may incorporate an autofocus (AF) mechanism whereby the object focal distance between an image sensor and a lens can be adjusted to focus an object plane in front of the camera at an image plane to be captured by the image sensor. However, the movability of the image sensor may also subject the image sensor and its associated mounting structure to unwanted movement, e.g., during a drop or shock event of a mobile device. Sometimes, the movement may be excessive to cause an unwanted collision of the sensor-shift structure such as a substrate that holds the image sensor with other components in vicinity such as a stationary base structure in the camera. The collision can cause damages to the base structure. Therefore, it is desirable to have protection structures to protect the base structure of a camera from such unwanted collision with a sensor-shift structure.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to protection structures of a camera for protecting a stationary base station from unwanted collisions with a sensor-shift structure of the camera. In some embodiments, the camera may include one or more lenses and an image sensor. The lenses may pass through light from an external environment into the camera, whilst the image sensor may receive the light and accordingly generate image signals, e.g., electrical signals. The image signals may be further processed by a processor to produce an image. In some embodiments, the camera may use a sensor-shift structure to move the image sensor relative to the lenses in one or more directions. For instance, the camera may include a substrate for holding the image sensor. The substrate may be suspended from a stationary base structure through a suspension structure. The suspension structure may allow the image sensor and the substrate to move together to implement various camera functions. For instance, the camera may include an actuator that may be used to control movement of the image sensor and substrate relative to the lenses in one or more directions (e.g., approximately along X- and/or Y-axis) orthogonal to an optical axis of the lenses (or Z-axis) to implement an optical image stabilization (OIS) function. In some embodiments, the image sensor and substrate may also be able to move under control of an actuator approximately along Z-axis to perform an autofocus (AF) function. In some embodiments, alternatively, the AF function may be implemented by moving the lenses, not the image sensor, along Z-axis. In some embodiments, the camera may be integrated as part of a mobile multipurpose device, such as a smartphone, tablet, pad device, and so on.

The movability or degrees of movement freemen however may subject the image sensor and substrate to unwanted movement. For example, during a drop or shock event of a mobile device, the image sensor and substrate of the camera inside the mobile device may move un-purposefully in various directions to cause a collision with other components proximate the sensor-shift structure, such as the base structure in the camera. The collision can cause damages to the base structure, which can further lead to reliability and/or performance concerns as to the camera. For instance, the base structure may normally constrain the extent of movement of the image sensor and substrate in one or more directions (e.g., along X- and/or Y-axis), i.e., how far the sensor-shift structure may move in those directions. However, when the base structure gets damaged, the limitation as to the movement of the sensor-shift structure may be lost. Excessive movement of the sensor-shift structure may create extra tensions and provide damages to other components, such as the suspension structure between the substrate and the base structure. In addition, damages to the base structure may cause the base structure to crack and/or deform, and particles to fall off the base structure. Deformation of the base structure may also cause unwanted contact between the base structure and other components and damage those components. Also, the particles may travel inside the camera to any possible locations, which can damage other components of the camera and/or affect the camera's image quality.

To address the issues, the camera disclosed herein may include one or more protection structures to protect the base structure from unwanted collisions with the sensor-shift structure. In some embodiments, the camera may include a protection structure attached to the substrate at one or more lateral sides of the substrate (e.g., sides of the substrate facing a direction (approximately along X- and/or Y-axis) orthogonal to the optical axis of the lenses (or Z-axis) of the camera), such that the protection structure may prevent the substrate from colliding directly with the base structure, e.g., a side wall of the base structure, during movement of the substrate towards the base structure approximately along X- and/or Y-axis. In other words, the protection structure may contact the base structure during such unwanted movement, such that the substrate may not collide directly with the base structure to cause damages. In some embodiments, the protection structure may be implemented using a metal or plastic frame wrapping around the substrate to protect the entire perimeter of the substrate. Alternatively, the protection structure may include several separate metal or plastic components affixed to one or more lateral sides of the substrate. Since the separate components may protrude from the lateral sides of the substrate to the base structure, they may touch the base structure first to prevent the base structure from direct collisions with the substrate. In addition, in some embodiments, the base structure, e.g., the side walls of the base structure facing the lateral sides of the substrate, may also include one or more portions protruding from the base structure and extending towards the lateral sides of the substrate. Furthermore, the protruding portions of the base structure may be located at positions corresponding to the lateral sides of the substrate or those separate protection components affixed at the lateral sides of the substrate. In still another example, the protection structure may be implemented using a layer of protective coating surrounding the entire perimeter of the substrate or positioned only at one or more individual locations, to provide the protectional functions described above. The protective coating may be implemented using materials such as solder resist, polyimide, and/or other appropriate materials.

Furthermore, in some embodiments, the camera may include another protection structure affixed to the substrate at a non-lateral side of the substrate, e.g., at a side of the substrate facing another portion of the base structure in a direction along Z-axis. For instance, the additional protection structure may be affixed to an underneath side of the substrate facing away from the lenses, and protect the base structure from collisions directly with the sensor-shift structure approximately along Z-axis. During movement of the substrate towards the base structure approximately along Z-axis, this additional protection structure may touch the base structure first such that the substrate may not directly collide with the base structure. In some embodiments, the additional protection structure may be implemented using metal or plastic materials, such as polyamide nylon (PA), liquid crystal polymer (LCP), and/or other materials. For distinction, in this disclosure, a protection structure for protecting the base structure from collisions approximately along X- and/or Y axis may be called the X/Y protection structure, whilst a protection structure for protection approximately along Z-axis may also be referred to as the Z protection structure. Note that the unwanted movement of the sensor-shift structure during a drop or shock event may be in various directions. In this disclosure, they are referred to as collisions approximately along X-, Y-, and/or Z-axis simply for purposes of illustration.

Alternatively, in some embodiments, protection structures may be implemented at both the substrate and the base structure. For instance, in some embodiments, the protection may include a first protection structure attached to one or more lateral sides of the substrate, and a second protection structure as part of the base structure. The first and second protection structures may individually include a portion protruding through one or more openings of a suspension structure that suspends the substrate from the base structure. The protruding portions of the first and second protection structures may face each other, such that the protruding portions of the protection structures may collide with each other to prevent the base structure from collisions directly with the substrate.

Alternatively, in still some other embodiments, protection may be implemented by reinforcing the mechanical strength of the base structure. For instance, a separate stronger protection structure may be attached to the base structure facing the substrate so as to serve as a "clad" in front of the base structure to protect the base structure from damages due to direct collisions with the substrate.

Figure 1A:
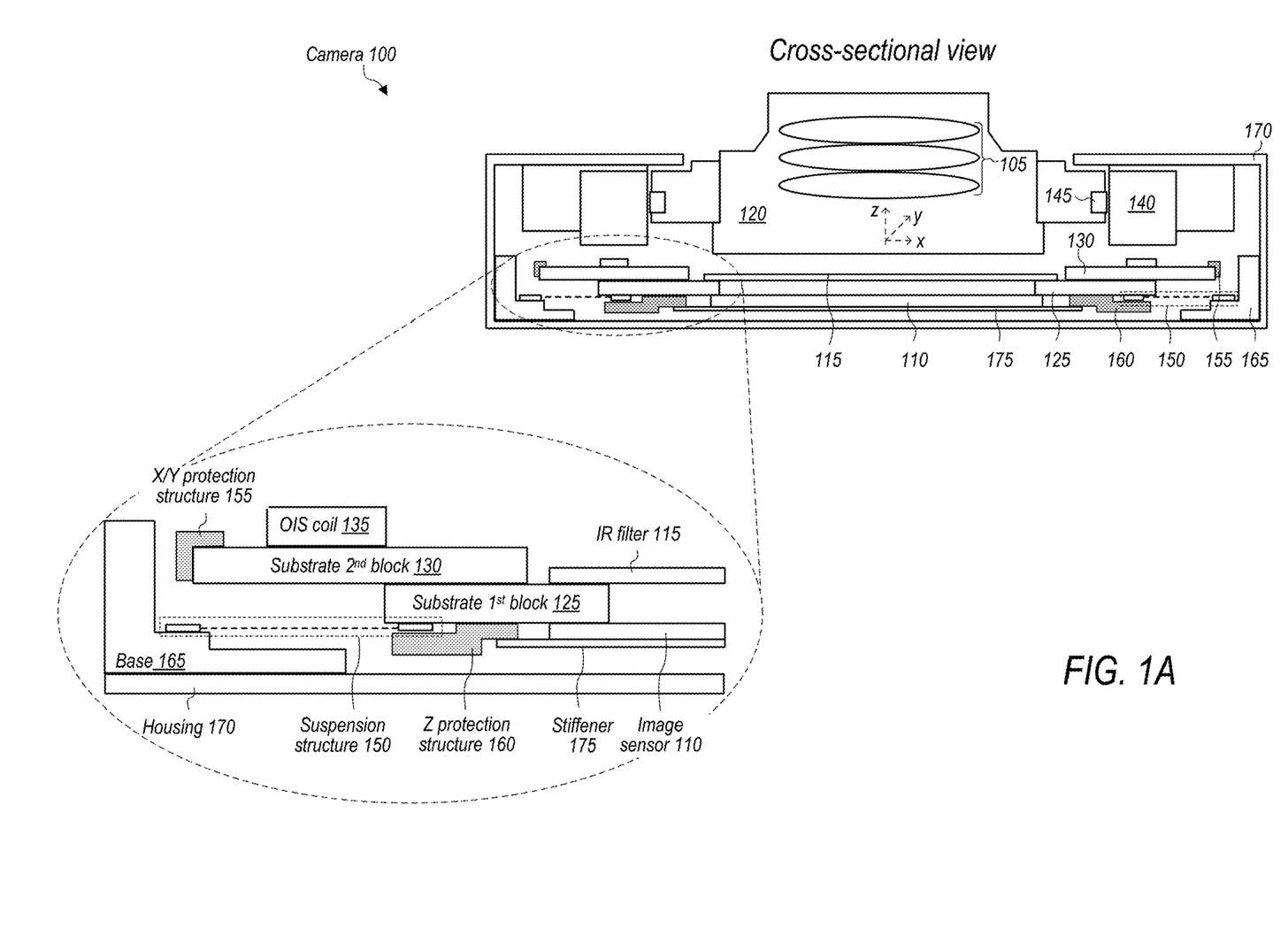
FIGS. 1A-1D show an example camera, according to some embodiments.

FIGS. 1A-1D show an example camera, according to some embodiments. For purposes of illustration, only relevant components are included in the figures. Furthermore, a coordinate system defined by X-Y-Z axes is also shown in the figures, and an optical axis of lenses 105 is defined as the Z-axis. In some embodiments, the optical axis may correspond to the transmission path of a principal light ray passing through lenses 105 to image sensor 110. In some embodiments, the transmission path of the principal light ray within camera 100 may not necessary be a straight but rather a folded line, e.g., when camera 100 includes a light folding element as part of the one or more lenses that may change the transmission direction of the principal light ray. In that case, the optical axis may refer to any straight part of the folded line. FIG. 1A is a cross-sectional view of the example camera. FIG. 1A also includes a zoomed view of a portion of the camera to further illustrate details of the projection structures. As indicated in FIG. 1A, camera 100 may include one or more lenses 105 and image sensor 110. Lenses 105 may pass through light on to image sensor 110 that may accordingly generate image signals. The image signals may be processed by a processor to produce an image. In some embodiments, camera 100 may include infrared filter 115 placed optically between lenses 105 and 110 to block or reduce infrared light from reaching image sensor 110.

In this example, both lenses 105 and image sensor 110 may be movable relative to one another. For instance, lenses 105 may be contained inside lens holder 120, and camera 100 may include a suspension structure (not shown) that suspends lens holder 120 from a stationary part of camera 100, e.g., housing 170 of camera 100. The suspension structure may allow lenses 105 (and lens holder 120) to move relative to image sensor 110 in a direction in parallel to the optical axis of lenses 105 (e.g., approximately along Z-axis) to perform AF. In addition, image sensor 110 and infrared filter 115 may be affixed to a substrate. In this example, the substrate may include a first substrate block 125 and a second substrate block 130, two of which may be joined together. Infrared filter 115 may be attached to a top side of substrate $1^{st}$ block 125 facing lenses 105, whilst image sensor 110 may be affixed to an underneath side of substrate $1^{st}$ block 125 facing away from lenses 105. Substrate $1^{st}$ block 125 may include an opening at the position over image sensor 110 to allow light passing through infrared filter 115 to reach image sensor 110. Further, substrate $2^{nd}$ block 130 may be used to hold other components and/or route electrical signals from and/or to image sensor 110. For instance, in some embodiments, substrate $1^{st}$ block 125 may be a ceramic substrate, whilst substrate block 130 may be an organic substrate (e.g., a printed circuit board or PCB). Note that, in some embodiments, the substrate may be implemented as one single piece, rather than separate blocks joined together. In some embodiments, camera 100 may further include stiffener 175 to further reinforce mounting of image sensor 110. The substrate and image sensor 110 may be suspended from a stationary part of camera 100, e.g., stationary base structure 165 (that may be further affixed with housing 170), using suspension structure 150. For instance, suspension structure 150 may include an inner frame and an outer frame, two of which may be connected through multiple flexure arms. The inner frame of suspension structure 150 may be affixed to substrate $1^{st}$ block 125, whilst the outer frame of suspension structure 150 may be fixedly coupled with base structure 165. Suspension structure 150 may allow image sensor 110 (and the substrate) to move relative to lenses 105 in one or more directions (e.g., approximately along X- and/or Y-axis) orthogonal to the optical axis of lenses 105 (or Z-axis) of camera 100, thus implementing an OIS function. Note that camera 100 is presented only as an example for purposes of illustration, and is not intended to limit use implementations of the present disclosure. For instance, in some embodiments, lenses 105 may be fixed and stationary, and only image sensor 110 may be movable in one or more directions, e.g., approximately along (1) Z-axis and/or (2) X- and/or Y-axis.

Movement of lenses 105 and/or image sensor 110 may be controlled using one or more actuators. In some embodiments, the actuators may be implemented using voice coil motor (VCM) actuators. For instance, as indicated in FIG. 1A, camera 100 may include one or more AF coils 145 contained in AF coil holders that are further affixed with lens holder 120. Thus, lenses 105 and AF coils 145 may be considered as one single rigid body to be able to move together. In addition, camera 100 may include one or more OIS coils 135 attached with substrate $2^{nd}$ block 130. Thus, OIS coils 135 and image sensor 110 may move together. Furthermore, camera 100 may include one or more magnets 140 held in magnets holders that are further fixedly coupled with housing 170 of camera 100. AF coils 145 may individually conduct respective current that may interact with magnetic fields of magnets 140 to generate motive force (e.g., Lorentz force) to move AF coils 145 and lenses 105 together relative to image sensor 110 approximately along Z-axis. Similarly, OIS coils 135 may individually interact electromagnetically with magnets 140 to cause movement of OIS coils 135 and image sensor 110 relative to lenses 105 approximately along X- and/or Y-axis.

As described above, the movability of image sensor 110 and the substrate may subject the sensor-shift structure to unwanted collisions with base structure 165. Thus, in some embodiments, camera 100 may include X/Y protection structure 155 and/or Z protection structure 160 to prevent the substrate of image sensor 110 from collisions directly with base structure 165. For instance, as indicated in FIG. 1A, in some embodiments, X/Y protection structure 155 may be affixed to substrate $2^{nd}$ block 130 of the substrate at one or more lateral sides of substrate $2^{nd}$ block 130 facing a direction approximately along X- and/or Y-axis. Therefore, when image sensor 110 and the substrate move unexpectedly towards base structure 165 approximately along X- and/or Y-axis, X/Y protection structure 155 may touch base structure 165 first and thus prevent substrate $2^{nd}$ block 130 of the substrate from directly colliding with base structure 165, e.g., the side walls of base structure 165. In addition, as indicated in FIG. 1A, in some embodiments, camera 100 may also include Z protection structure 160 attached to a non-lateral side of the substrate, such as the underneath side of substrate $1^{st}$ block 125 facing optically away from lenses 105 but proximate another portion of base structure 165. Protection structure 160 may or may not be attached with the inner frame of suspension structure 150. Z protection structure 160 may protect base structure 165, e.g., the bottom portion of base structure 165, from damages due to collisions directly with substrate $1^{st}$ block 125 of the substrate when the substrate moves towards base structure 165 approximately along Z-axis.

Figure 1B:
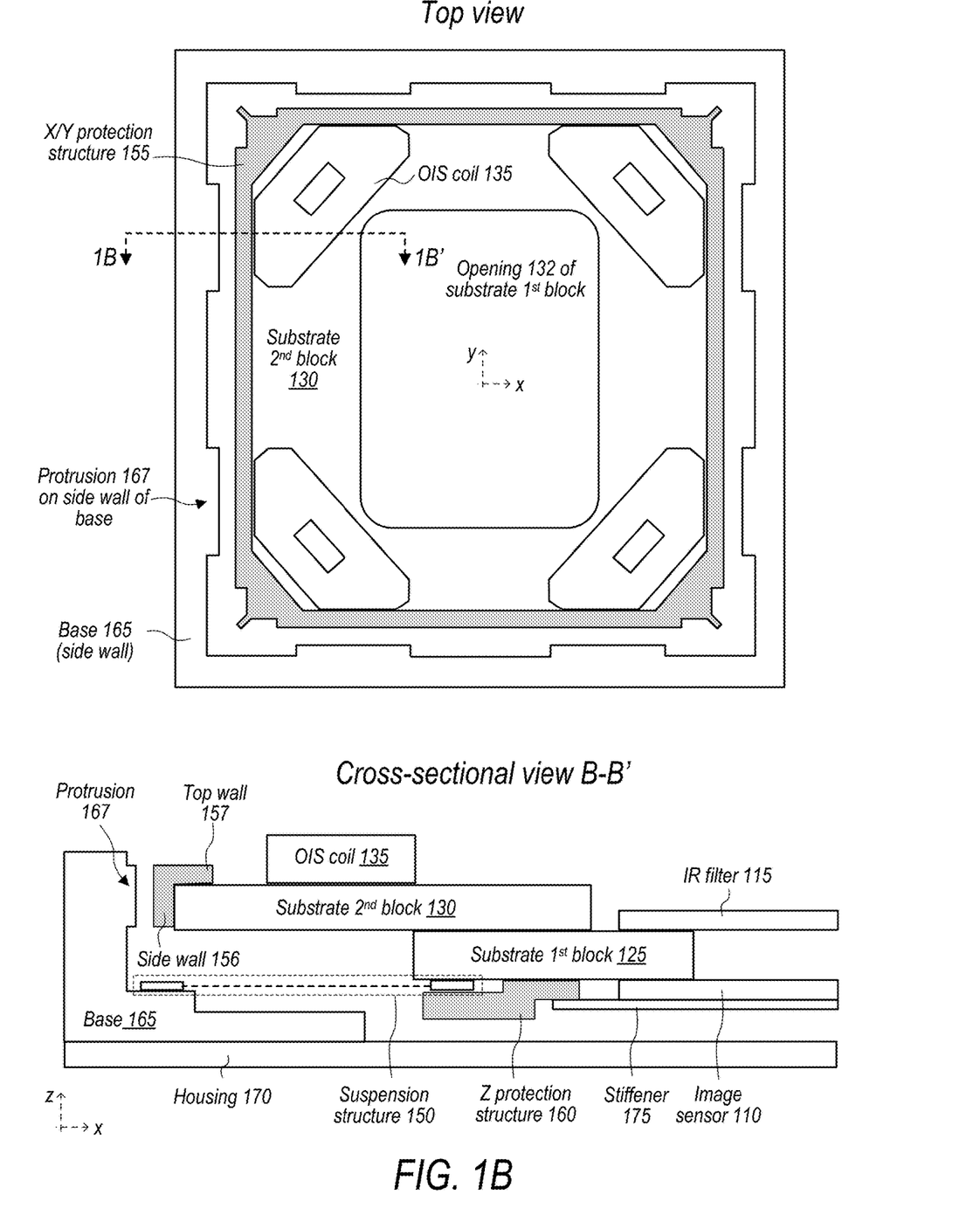

FIG. 1B shows a top view of the sensor-shift structure of camera 100, together with the corresponding zoomed cross-sectional view from the perspective B-B', according to some embodiments. As indicated in FIG. 1B, X/Y protection structure 155 may wrap around a perimeter of substrate $2^{nd}$ block 130. In some embodiments, X/Y protection structure 155 may include one or more side walls 156 affixed to the lateral sides of substrate $2^{nd}$ block 130. In some embodiments, X/Y protection structure 155 may further include one or more top walls 157 bent from side walls 156 to cover at least a portion of a non-lateral side of substrate $2^{nd}$ block 130, such as a portion of the top side facing lenses 105 approximately along Z-axis. In addition, in some embodiments, base structure 165, e.g., the side walls of base structure 165 facing the lateral sides of substrate $2^{nd}$ block 130, may include one or more portions 167 protruding from base structure 165 and extending towards substrate $2^{nd}$ block 130. In some embodiments, portions 167 may be located at positions corresponding to X/Y protection structure 155 (e.g., side walls 156 of X/Y protection structure 155) and/or the lateral sides of substrate $2^{nd}$ block 130. As indicated in FIG. 1B, portions 167 may provide an additional "stopper" to restrain movement of substrate $2^{nd}$ block 130 towards base structure 165 approximately along X- and/or Y-axis, thus protecting base structure 165 from damages due to collisions directly with the substrate. For instance, portions 167 of base structure 165 and side walls 156 of X/Y protection structure 155 may contact each other when the substrate moves excessively towards base structure 165 approximately along X- and/or Y-axis, thus preventing the substrate from directly colliding with base structure 165 to cause damages.

As indicated in FIG. 1B, Z protection structure 160 may be affixed to a non-lateral side of substrate $1^{st}$ block 125, such as the underneath side facing optically away from lenses 105 but proximate another portion (e.g., the bottom portion) of base structure 165. When the substrate moves unexpectedly towards the bottom portion of base structure 165 approximately along Z-axis, Z protection structure 160 may prevent the substrate from directly colliding with base structure 165. Note that FIG. 1B also shows OIS coils 135 attached to substrate $2^{nd}$ block 130, and opening 132 of substrate $1^{st}$ block 125 that passes through light from infrared filter 115 to image sensor 110. Note that in some embodiments, Z protection structure 160 may include at least a portion extending towards the bottom portion of base structure 165 approximately along X- and/or Y-axis, such that Z protection structure 160 may also act as a secondary "stopper" to X/Y protection structure 155 to provide constraints on movement of the substrate approximately along X- and/or Y-axis. In other words, in some embodiments, when the substrate moves excessively towards base structure 165 approximately along X- and/or Y-axis, the extending portion of Z protection structure 160 towards base structure 165 may contact base structure 165 to prevent the substrate from further moving towards the base structure 165 if X/Y protection structure 155 is not sufficient. In some embodiments, X/Y protection structure 155 may help to reduce the height of camera 100 along Z-axis (or Z-height). This is because without X/Y protection structure 155, camera 100 may need to increase the Z-heights of the bottom portion of base structure 165 and/or Z protection structure 160 in order to use these components to constrain movement of the substrate along X- and/or Y-axis. By using X/Y protection structure 155, this functional requirement may be taken away from base structure 165 and Z protections structure 160. As a result, the Z-height of camera 100 may be reduced. In some embodiments, reduction of the Z-height for camera 100 may be in a range of a few tens of micrometers to a few hundreds of micrometers.

Figure 1C:
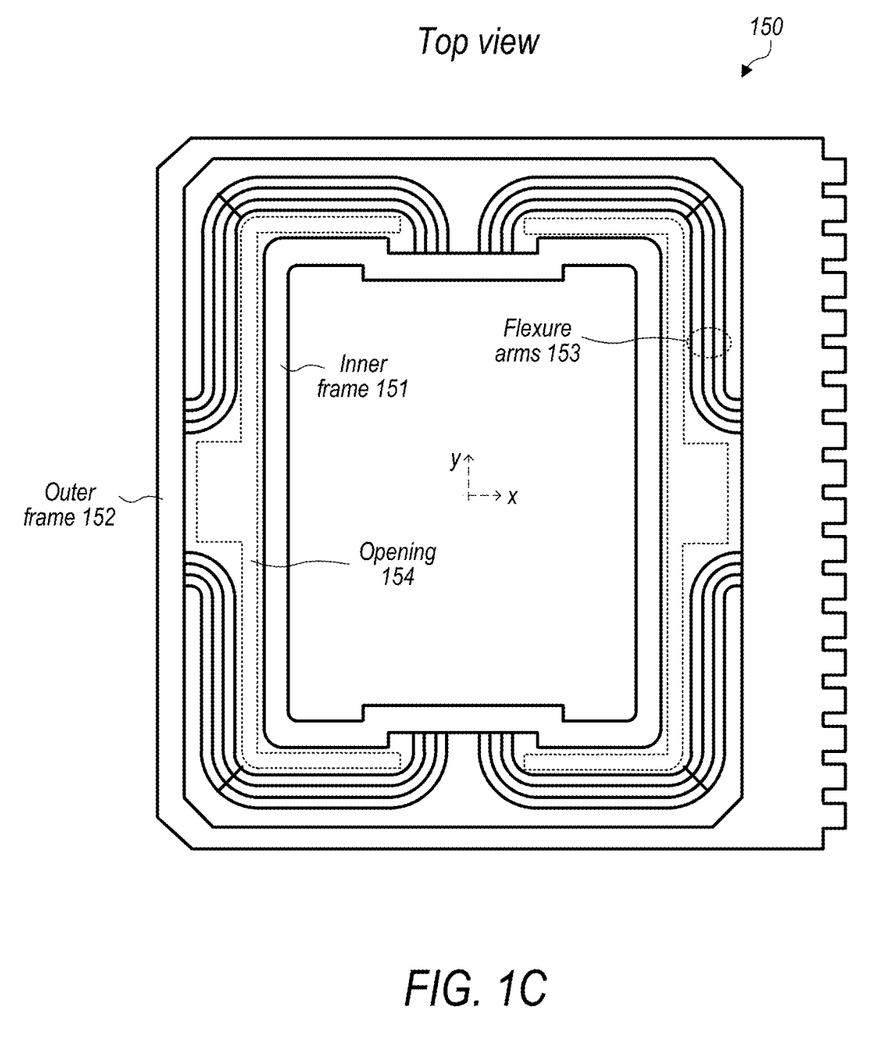

FIG. 1C shows an example design for suspension structure 150, according to some embodiments. As indicated in FIG. 1C, suspension structure 150 may include inner frame 151 and outer frame 152, two of which may be connected through flexure arms 153. As described above, inner frame 151 may be attached to substrate $1^{st}$ block 125 (upon which image sensor 110 is also mounted), whilst outer frame 152 may be affixed with base structure 165. Thus, suspension structure 150 may suspend substrate $1^{st}$ block 125 (and thus the entire substrate) from base structure 165. As seen in FIG. 1C, flexure arms 153 may allow inner frame 151 to contract or extend with respect to outer frame 152 primarily approximately along X- and/or Y-axis. Thus, suspension structure 150 may allow image sensor 110 (and the substrate) to move relative to lenses 105 approximately along X- and/or Y-axis. In addition, because of the elasticity of flexure arms 153, sudden drop or shock may also cause image sensor 110 and the substrate to move approximately along Z-axis. Movability of the substrate approximately along X-, Y- and/or Z-axis can cause unwanted collisions of the substrate with base structure 165, as described above. Note that FIG. 1C also depicts one or more opening 154 of suspension structure 150, as indicated by the dotted lines. Opening 154 may be implemented using a gap between flexure arms 153 and inner frame 151 (as indicated in FIG. 1C), a gap between flexure arms 153 and outer frame 152, or a gap between two or more of flexure arms 153. In some embodiments, opening 154 may be used for implementing other designs of protection structures, as described below in FIG. 2.

Figure 1D:
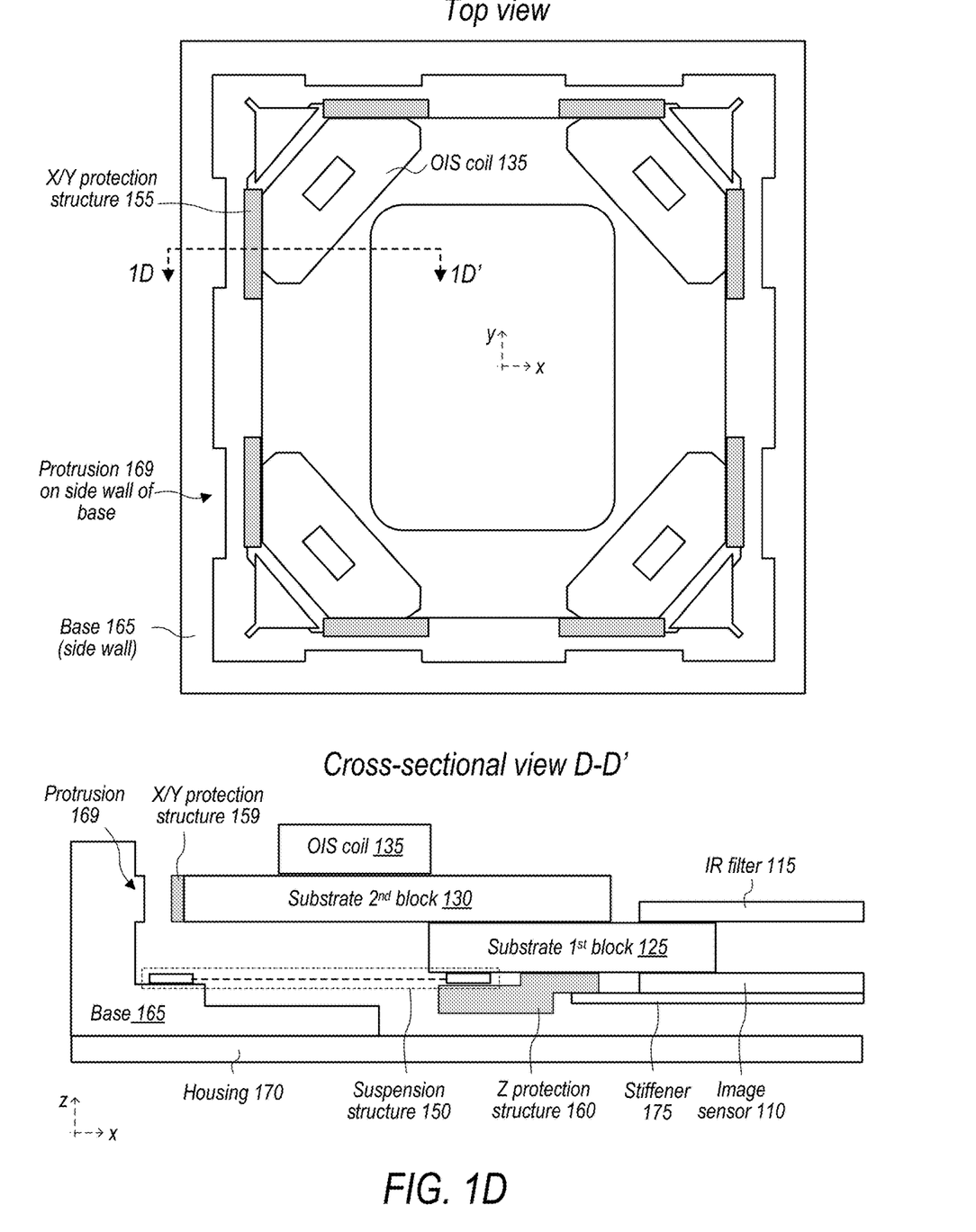

FIG. 1D shows an alternative design for the X/Y protection structure of a camera, according to some embodiments. As indicated in FIG. 1D, X/Y protection structure 159 in FIG. 1D replaces X/Y protection structure 157 in FIG. 1B. X/Y protection structure 159 may include several separate components affixed to one or more lateral sides of substrate $2^{nd}$ block 130. Further, base structure 165 may include one or more portions 169 protruding from base structure 165 towards X/Y protection structure 159. In some embodiments, portions 169 may be located at positions corresponding to the separate components of X/Y protection structure 159.

The protection structures described above (e.g., X/Y protection structures 157 and 159, and/or Z protection structure 160) may be implemented in various ways. For instance, in some embodiments, a protection structure may be implemented using metal, plastic (e.g., polyamide nylon (PA) or liquid crystal polymer (LCP)) and/or other materials. Alternatively, in some embodiments, the protection structure may be implemented using protective coating, such as one or more layers of protective coating using materials such as solder resist, polyimide, and the like.

Figure 2:
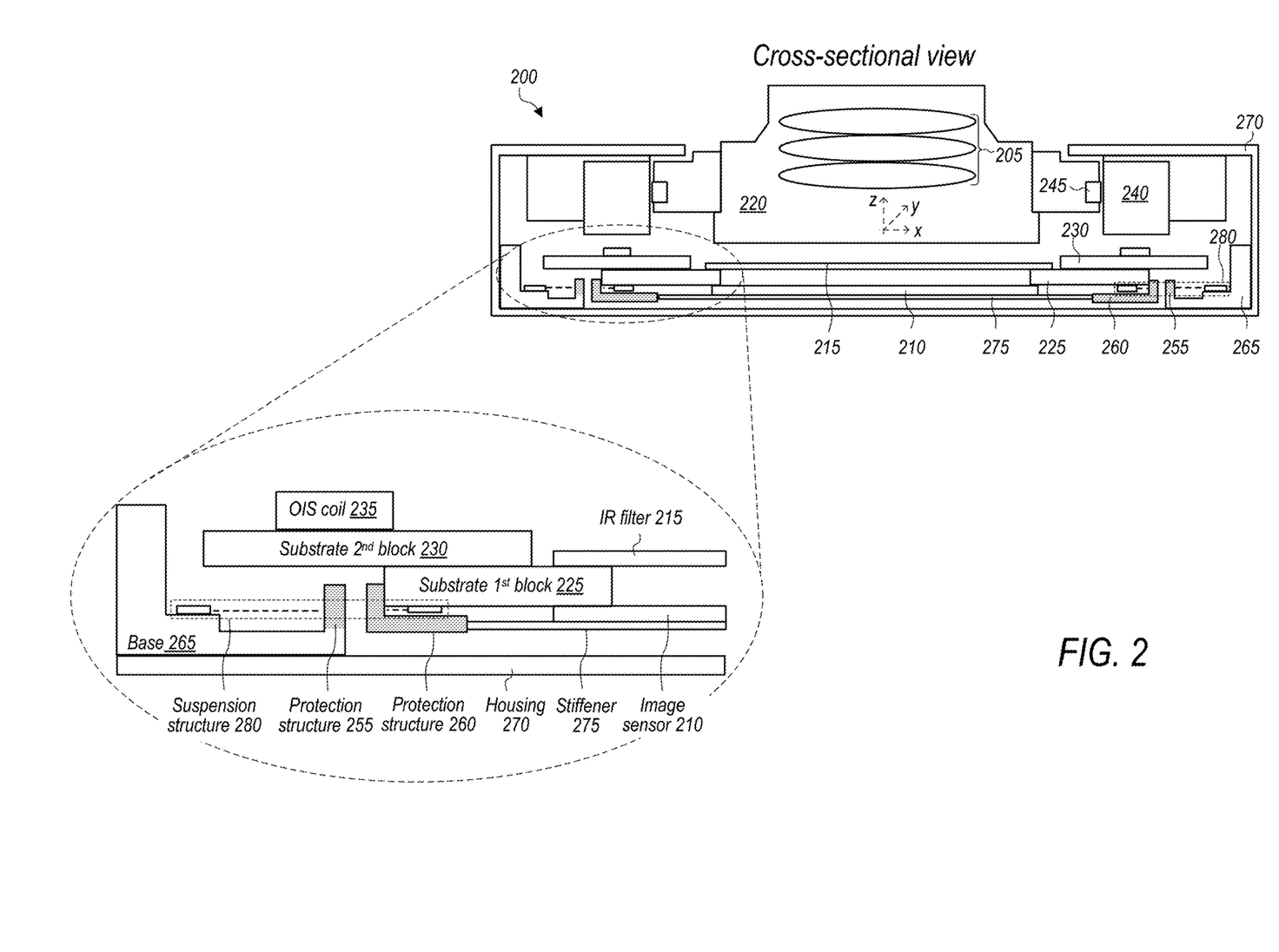
FIG. 2 shows another example camera, according to some embodiments.

FIG. 2 shows another example camera, according to some embodiments. As indicated in FIG. 2, camera 200 in FIG. 2 may be similar to camera 100 in FIGS. 1A-1D except for a different design for protection structures. As shown in FIG. 2, camera 200 may include one or more lenses 205, image sensor 210, and infrared light filter 215. Lenses 205 may be held inside lens holder 220, whilst image sensor 210 and infrared light filter 215 may be attached to substrate $1^{st}$ block 225. Substrate $1^{st}$ block 225 may be further joined with substrate $2^{nd}$ block 230. Suspension structure 280 may suspend image sensor 210 and the substrate (including $1^{st}$ block 225 and $2^{nd}$ block 230) from base structure 265. Therefore, image sensor 210 and the substrate may be movable relative to lenses 205. Camera 200 may include OIS coils 235 affixed to substrate $2^{nd}$ block 230, and AF coils 240 fixedly coupled (directly) with lenses 205. OIS coils 235 and AF coils 240 may electromagnetically operate with magnets 240 to move image sensor 210 and lenses 205 to implement OIS and AF functions.

In some embodiments, camera 200 may include protection structures 255 and 260. As indicated in FIG. 2, protection structure 255 may be part of base structure 265 and protrude from base structure 265 through an opening of suspension structure 280 (e.g., like opening 154 of suspension structure 150 in FIG. 1C). In some embodiments, protection structure 260 may be affixed to substrate $1^{st}$ block 225 of the substrate. Protection 260 may also include at least one portion protruding through the opening of suspension structure 280. In some embodiments, suspension structure 280 may be different from suspension structure 150, e.g., with a larger opening in order to accommodate the protruding portions of protection structures 255 and 260. Protection structure 255 (i.e., the protruding portion of base structure 256) and the protruding portion of protection structure 260 may face each other, such that the two parts may touch each other when the substrate moves excessively towards base structure 165, e.g., approximately along X-, Y-, and/or Z-axis. This may thus prevent the substrate from directly colliding with base structure 165 to cause damages. Similar to camera 100, protection structure 260 may also be implemented using metal, plastic, protective coating, and/or other materials. In addition, as indicated in FIG. 2, protection structures 255 and 260 protrude approximately along Z-height towards lenses 205, using readily available space between substrate $1^{st}$ block 225 and substrate $2^{nd}$ block 230. Therefore, design of the protection structures of camera 200 may also help to reduce the Z-height of camera 200.

Figure 3:
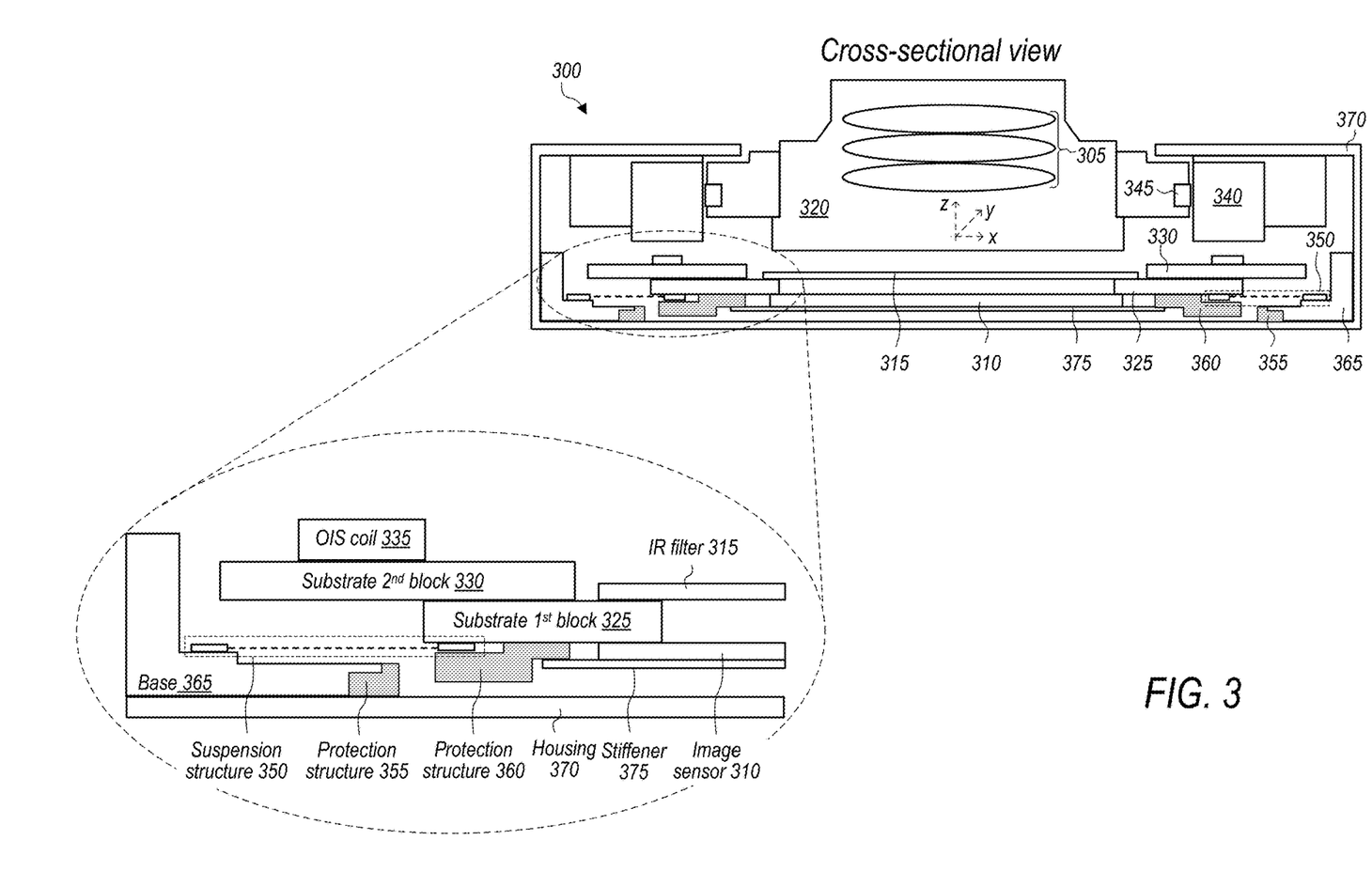
FIG. 3 shows another example camera, according to some embodiments.

FIG. 3 shows still another example camera, according to some embodiments. Camera 300 in FIG. 3 may be similar to cameras 100 and 200 in FIGS. 1-2, but having a different design for the protection structure. As indicated in FIG. 3, camera 300 may include one or more lenses 305, image sensor 310, and infrared light filter 315. Lenses 305 may be held inside lens holder 320, whilst image sensor 310 and infrared light filter 315 may be attached to substrate $1^{st}$ block 325. Substrate $1^{st}$ block 325 may be further joined with substrate $2^{nd}$ block 330. Suspension structure 350 may suspend image sensor 310 and the substrate (including $1^{st}$ block 325 and $2^{nd}$ block 330) from base structure 365. Therefore, image sensor 310 and the substrate may be movable relative to lenses 305. Camera 300 may include OIS coils 335 affixed to substrate $2^{nd}$ block 330, and AF coils 340 fixedly coupled (directly) with lenses 305. OIS coils 335 and AF coils 340 may electromagnetically operate with magnets 340 to move image sensor 310 and lenses 305 relative to each other to implement OIS and AF functions.

In some embodiments, camera 300 may include protection structures 355 and 360. As indicated in FIG. 3, protection structure 355 may be a separate component attached to base structure 365, whilst protection structure 360 may be affixed to substrate $1^{st}$ block 325 of the substrate. Protection structure 355 may be implemented using materials of larger hardness than base structure 365. For instance, in some embodiments, protection structure 355 may be implemented using relatively strong materials such as polyamide nylon (PA) or liquid crystal polymer (LCP). Thus, protection structure 355 may reinforce the robustness of base structure 365. When the substrate moves towards base structure 365, e.g., approximately along X-, Y-, and/or Z-axis, protection structures 355 and 360 may collide with each other to prevent base structure 365 from damages due to collisions directly with the substrate.

Figure 4:
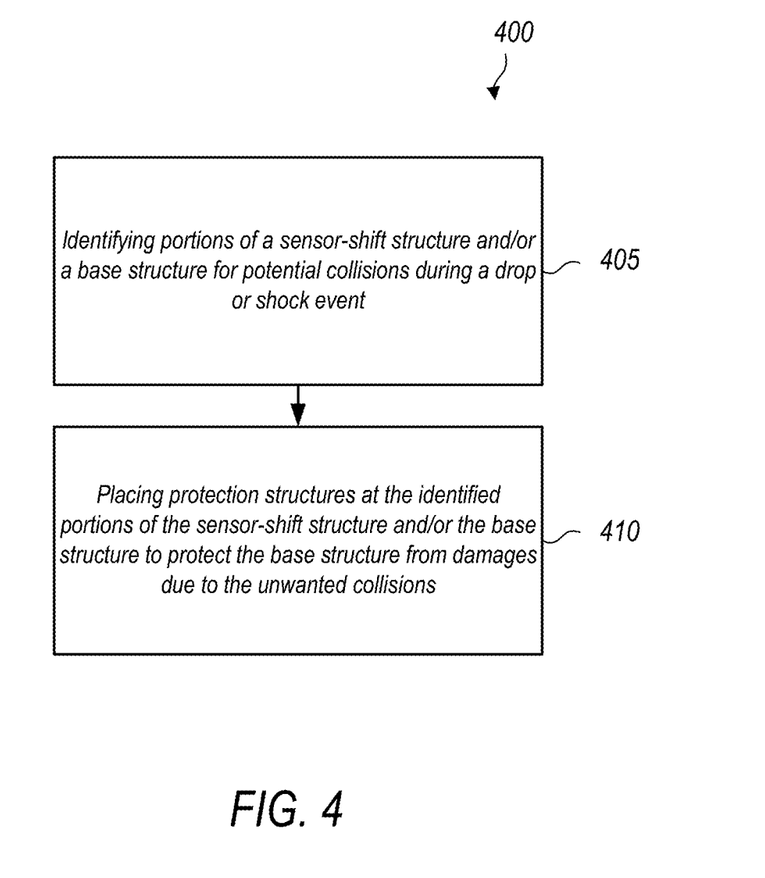
FIG. 4 is a high-level flowchart showing an example method for implementing protection structures for a camera, according to some embodiments.

FIG. 4 is a high-level flowchart showing an example method for implementing protection structures for a camera, according to some embodiments. As shown in FIG. 4, one or more portions of a sensor-shift structure and/or a base structure of a camera may be identified for potential collisions during a drop or shock event, as indicated in block 405. For instance, with respect to camera 100, the lateral sides of substrate $2^{nd}$ block 130 of the substrate and/or the corresponding side walls of base structure 165 may be determined as the potential weak points for damages from the unwanted collisions. In addition, in some embodiments, the underneath side of substrate $1^{st}$ block 125 of the substrate and the corresponding bottom portion of base structure 165 may be identified as additional portions for the potential collisions during the drop or shock event. Accordingly, one or more protections structures may be placed at the identified portions of the sensor-shift structure and/or the base structure to protect the base structure from damages due to the unwanted collisions, as indicated in block 410. As described above, in some embodiments, the protection structures such as X/Y protection structures 155 (or 159) and Z protection 160 may be attached to substrate $2^{nd}$ block 130 and substrate $1^{st}$ block 125 of the substrate, respectively, to prevent the substrate from directly colliding with base structure 165. Alternatively, in some embodiments, protruding protection structures 255 and 260 may be added to base structure 265 and substrate $1^{st}$ block 225 of the substrate, respectively, to protect base structure 265 from damages due to collisions directly with the substrate. Alternatively, in some embodiments, reinforced protection structure 335 may be affixed to base structure 365, with protection structure 360 added to substrate $1^{st}$ block 325 of the substrate, to protect base structure 365 from unwanted collisions with the sensor-shift structure.

Figure 5:
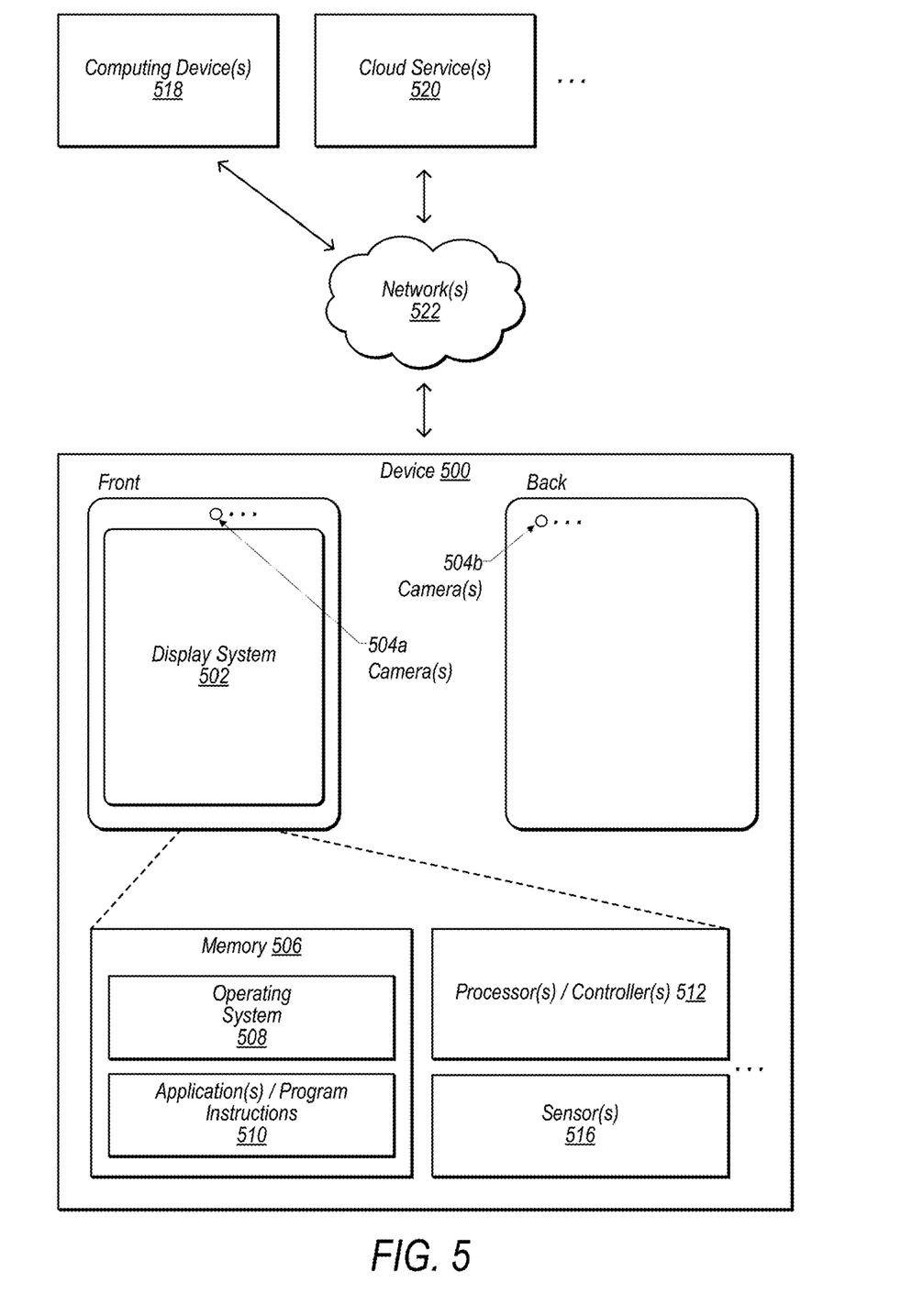
FIG. 5 shows a schematic representation of an example device that may include a camera having one or more protection structures, according to some embodiments.

FIG. 5 illustrates a schematic representation of an example device 500 that may include a camera having one or more protection structures, e.g., as described herein with reference to FIGS. 1-4, according to some embodiments. In some embodiments, the device 500 may be a mobile device and/or a multifunction device. In various embodiments, the device 500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 500 may include a display system 502 (e.g., comprising a display and/or a touch-sensitive surface) and/or one or more cameras 504. In some non-limiting embodiments, the display system 502 and/or one or more front-facing cameras 504a may be provided at a front side of the device 500, e.g., as indicated in FIG. 5. Additionally, or alternatively, one or more rear-facing cameras 504b may be provided at a rear side of the device 500. In some embodiments comprising multiple cameras 504, some or all of the cameras may be the same as, or similar to, each other. Additionally, or alternatively, some or all of the cameras may be different from each other. In various embodiments, the location(s) and/or arrangement(s) of the camera(s) 504 may be different than those indicated in FIG. 5.

Among other things, the device 500 may include memory 506 (e.g., comprising an operating system 508 and/or application(s)/program instructions 510), one or more processors and/or controllers 512 (e.g., comprising CPU(s), memory controller(s), display controller(s), and/or camera controller(s), etc.), and/or one or more sensors 516 (e.g., orientation sensor(s), proximity sensor(s), and/or position sensor(s), etc.). In some embodiments, the device 500 may communicate with one or more other devices and/or services, such as computing device(s) 518, cloud service(s) 520, etc., via one or more networks 522. For example, the device 500 may include a network interface (e.g., network interface 610) that enables the device 500 to transmit data to, and receive data from, the network(s) 522. Additionally, or alternatively, the device 500 may be capable of communicating with other devices via wireless communication using any of a variety of communications standards, protocols, and/or technologies.

Figure 6:
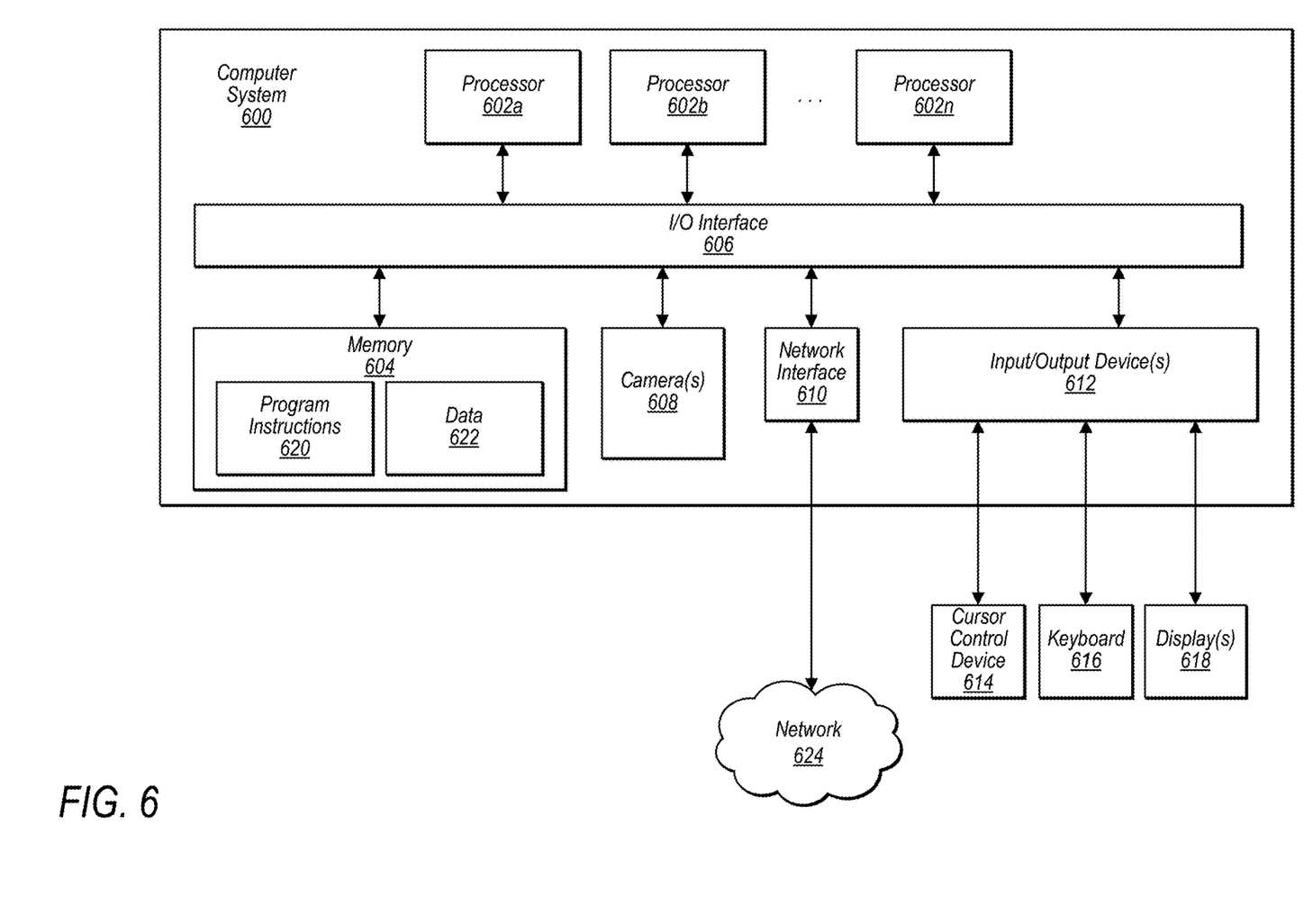
FIG. 6 shows a schematic block diagram of an example computer system that may include a camera having one or more protection structures, according to some embodiments.

FIG. 6 illustrates a schematic block diagram of an example computing device, referred to as computer system 600, that may include or host embodiments of a camera having one or more protection structures, e.g., as described herein with reference to FIGS. 1-5, according to some embodiments. In addition, computer system 600 may implement methods for controlling operations of the camera and/or for performing image processing images captured with the camera. In some embodiments, the device 500 (described herein with reference to FIG. 5) may additionally, or alternatively, include some or all of the functional components of the computer system 600 described herein.

The computer system 600 may be configured to execute any or all of the embodiments described above. In different embodiments, computer system 600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 600 includes one or more processors 602 coupled to a system memory 604 via an input/output (I/O) interface 606. Computer system 600 further includes one or more cameras 608 coupled to the I/O interface 606. Computer system 600 further includes a network interface 610 coupled to I/O interface 606, and one or more input/output devices 612, such as cursor control device 614, keyboard 616, and display(s) 618. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 602, or a multiprocessor system including several processors 602 (e.g., two, four, eight, or another suitable number). Processors 602 may be any suitable processor capable of executing instructions. For example, in various embodiments processors 602 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 602 may include additional types of processors, such as graphics processing units (GPUs), application specific integrated circuits (ASICs), etc. In multiprocessor systems, each of processors 602 may commonly, but not necessarily, implement the same ISA. In some embodiments, computer system 600 may be implemented as a system on a chip (SoC). For example, in some embodiments, processors 602, memory 604, I/O interface 606 (e.g., a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 604 may be configured to store program instructions 620 accessible by processor 602. In various embodiments, system memory 604 may be implemented using any suitable memory technology, such as static random access memory (SRAM), synchronous dynamic RAM (SDRAM), nonvolatile/Flash-type memory, or any other type of memory. Additionally, existing camera control data 622 of memory 604 may include any of the information or data structures described above. In some embodiments, program instructions 620 and/or data 622 may be received, sent or stored upon different types of computer-accessible media or on similar media separate from system memory 604 or computer system 600. In various embodiments, some or all of the functionality described herein may be implemented via such a computer system 600.

In one embodiment, I/O interface 606 may be configured to coordinate I/O traffic between processor 602, system memory 604, and any peripheral devices in the device, including network interface 610 or other peripheral interfaces, such as input/output devices 612. In some embodiments, I/O interface 606 may perform any necessary protocol, timing or other data transformations to convert data signals from one component (e.g., system memory 604) into a format suitable for use by another component (e.g., processor 602). In some embodiments, I/O interface 606 may include support for devices attached through various types of peripheral buses, such as a variant of the Peripheral Component Interconnect (PCI) bus standard or the Universal Serial Bus (USB) standard, for example. In some embodiments, the function of I/O interface 606 may be split into two or more separate components, such as a north bridge and a south bridge, for example. Also, in some embodiments some or all of the functionality of I/O interface 606, such as an interface to system memory 604, may be incorporated directly into processor 602.

Network interface 610 may be configured to allow data to be exchanged between computer system 600 and other devices attached to a network 624 (e.g., carrier or agent devices) or between nodes of computer system 600. Network 624 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 610 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 612 may, in some embodiments, include one or more display terminals, keyboards, keypads, touchpads, scanning devices, voice or optical recognition devices, or any other devices suitable for entering or accessing data by one or more computer systems 600. Multiple input/output devices 612 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 610.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
    one or more lenses;
    a substrate;
    an image sensor configured to receive light from the one or more lenses along an optical axis, wherein the image sensor is attached to the substrate such that the image sensor and the substrate move together relative to the one or more lenses in one or more directions; and
    a first protection structure attached to the substrate at least at one lateral side of the substrate and a second protection structure attached to the substrate at a non-lateral side of the substrate to prevent the substrate from colliding directly with a base structure.

2. The system of claim 1, wherein the first protection structure includes a metal or plastic frame wrapping around a perimeter of the substrate along one or more directions orthogonal to the optical axis.

3. The system of claim 1, wherein the first protection structure includes several separate metal or plastic components attached to the at least one lateral side of the substrate.

4. The system of claim 1, wherein the first protection structure includes a layer of coating using a solder resist material or polyimide.

5. The system of claim 1, wherein the second protection structure is implemented using metal or plastic materials.

6. The system of claim 1, wherein a portion of the second protection structure extends towards the base structure in a direction orthogonal to the optical axis such that the extended portion of the second protection structure prevents the substrate from colliding directly with the base structure in the direction orthogonal to the optical axis.

7. The system of claim 1, further comprising:
a voice coil motor (VCM) actuator configured to implement movement of the image sensor and the substrate relative to the one or more lenses in one or more directions.

8. The system of claim 1, further comprising:
a suspension structure including one or more flexure arms and configured to suspend the substrate from the base structure so as to allow the image sensor and the substrate to move in the one or more directions.

9. A system, comprising:
one or more lenses;
a substrate;
an image sensor configured to receive light from the one or more lenses along an optical axis, wherein the image sensor attached to the substrate such that the image sensor and the substrate move together in one or more directions;
a suspension structure including one or more flexure arms and configured to suspend the substrate from a base structure; and
a protection structure attached to the substrate and including a portion protruding through an opening of the suspension structure so as to protect the base structure from collisions directly with the substrate.

10. The system of claim 9, wherein the base structure further includes a portion protruding through the opening of the suspension structure so as to contact the protruding portion of the protection structure prior to contact between the substrate and the base structure when the substrate moves towards the base structure.

11. The system of claim 9, wherein the suspension structure comprises one or more flexure arms and configured to suspend the substrate from the base structure so as to allow the image sensor and the substrate to move in the one or more directions.

12. The system of claim 9, wherein the protection structure includes a layer of coating using a solder resist material or polyimide.

13. The system of claim 9, further comprising:
a voice coil motor (VCM) actuator configured to implement movement of the image sensor and the substrate relative to the one or more lenses in one or more directions.

14. A system, comprising:
one or more lenses defining an optical axis;
a substrate;
an image sensor attached to the substrate such that the image sensor and the substrate move together relative to the one or more lenses in one or more directions; and
a first protection structure attached to the substrate, and a second protection structure attached to a base structure protruding out of a surface of the base structure towards the first protection structure on the substrate to prevent the substrate from colliding with the base structure.

15. The system of claim 14, wherein the first protection structure includes a metal or plastic frame wrapping around a perimeter of the substrate along one or more directions orthogonal to the optical axis.

16. The system of claim 14, wherein the first protection structure includes a layer of coating using a solder resist material or polyimide.

17. The system of claim 14, further comprising:
a voice coil motor (VCM) actuator configured to implement movement of the image sensor and the substrate relative to the one or more lenses in one or more directions.

18. The system of claim 14, further comprising:
a suspension structure including one or more flexure arms and configured to suspend the substrate from the base structure so as to allow the image sensor and the substrate to move in the one or more directions.

* * * * *